Oct. 10, 1944.  C. R. DALE  2,360,041
APPARATUS FOR SUBSURFACE PRESSURE DETERMINATIONS IN WELLS
Filed July 26, 1943
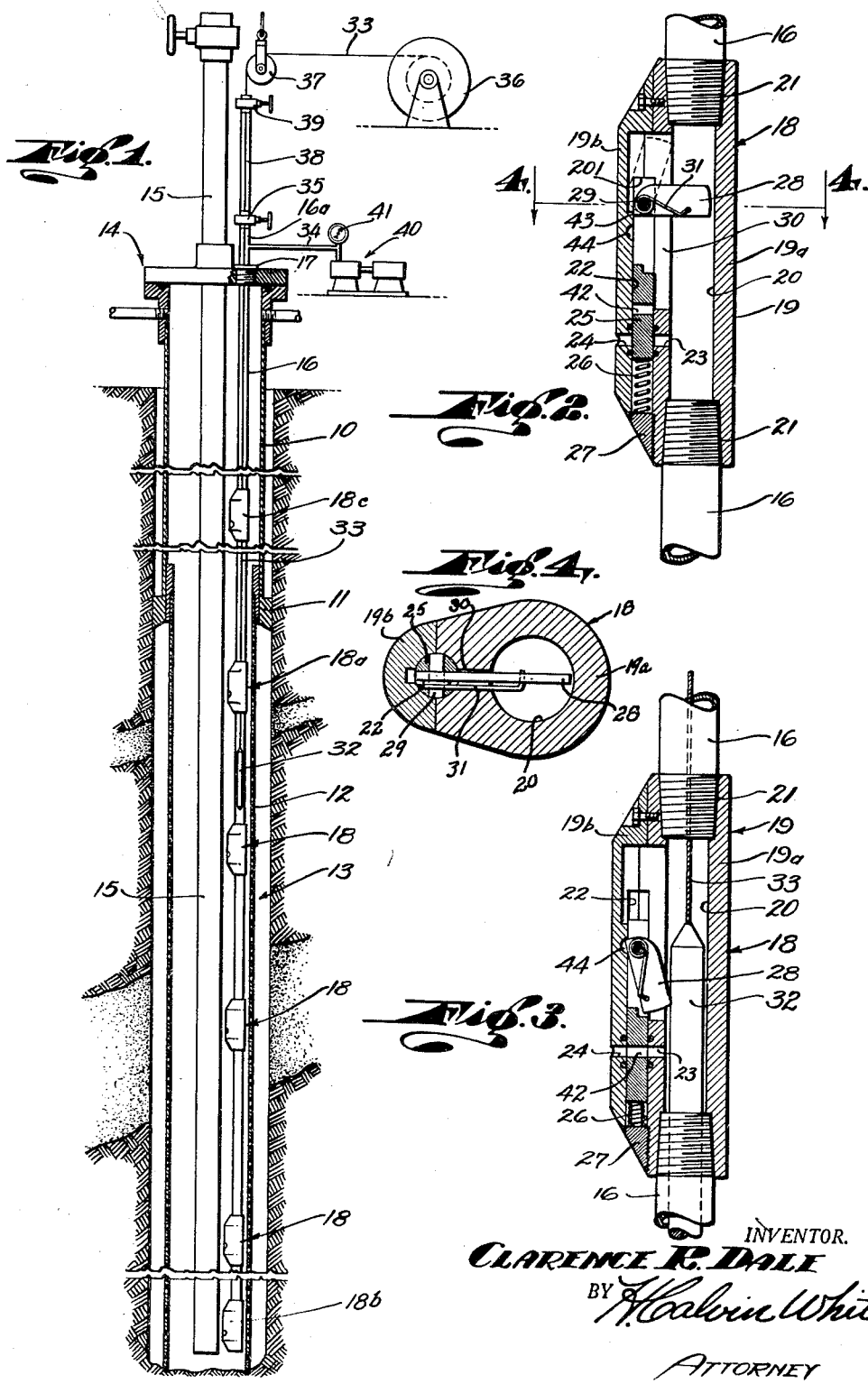
INVENTOR.
CLARENCE R. DALE
BY Halvin White
ATTORNEY Patented Oct. 10, 1944

2,360,041

UNITED STATES PATENT OFFICE 2,360,041

APPARATUS FOR SUBSURFACE PRESSURE DETERMINATIONS IN WELLS

Clarence R. Dale, Altadena, Calif.

Application July 26, 1943, Serial No. 496,173

11 Claims. (Cl. 73—151)

This invention has to do generally with subsurface pressure determinations, and relates particularly to an improved system for the measurement of pressures in oil wells at locations within the extended zone between the flow tubing and the casing, screen or well bore, as the case may be.

My primary object is to provide a system of extreme simplicity and accurate reliability capable of use in pumping or flowing wells for determining pressures at any desired locations and intervals within the well. The invention is directed particularly to the determination of pressures within the producing region of the well, say at the inside of the usual liner or perforated section of the casing, or throughout the height of the column of well liquid, for such purposes as to ascertain the total pressure at any certain location, or the liquid column pressure at that point (from which the height of the liquid column above may be calculated), or to determine fluid column pressures at several points, and by pressure gradients plotted on the basis of the measured pressures, the location and extent of different fluid strata, e. g. gas, oil, and water. Of particular importance for all such purposes is the adaptability of the invention for very accurate pressure measurements, whether the well be pumping or flowing under natural pressure.

Another important feature of the invention is the provision of a type of equipment for pressure determinations, which can be run into the well on any occasion for making pressure determinations, or which at any time before or after the well is brought into production, may be installed and thereafter permanently maintained in the well as an immediately available means for measuring pressures.

In accordance with its preferred form, the invention contemplates running into the well, to the bottom thereof or to any desired depth, a small diameter conduit, say one-half inch i. d. metal tubing, carrying a series of valves controlling the discharge of fluid from the conduit, and spaced at suitable intervals in contemplation of the determination of the well pressures at corresponding intervals. Selective operation of the valves preferably is controlled from the top of the well, as by means of a valve operating element lowered on the line within the conduit and co-acting with the valves in a manner causing them to be sequentially opened and closed as the operating element is moved from valve to valve. According to the embodiment later described, the valves normally may be closed. Progressive downward movement of the operating element causes sequential opening and closing of all or any desired number of the valves.

The well pressures at the valve locations are determined by forcing a fluid, preferably air or other gas, through the conduit and measuring at the ground surface the pressure required to discharge the gas through a particular valve open at the time. As will be apparent, the pressure required to force gas from the conduit at a given location into the well, corresponds to and constitutes a measurement of the well pressure at that location, and assumes a constant value as the gas discharge continues.

For a more complete understanding of the various features and objects of the invention, as well as the details of a typical and illustrative embodiment, reference may be had to the accompanying drawing in which:

Fig. 1 is a sectional view of a well containing the pressure measuring apparatus, the discharge conduit appearing in section for purposes of clarity;

Fig. 2 is a sectional view of one of the valves, the valve proper being in closed position;

Fig. 3 is a similar view showing the valve in open position; and

Fig. 4 is a cross-section on line 4—4 of Fig. 2.

In Fig. 1 the well is shown conventionally to contain the usual casing 10 carrying a shoe 11 above which the casing may be cemented, and a perforated liner 12 extending below the casing within the production zone 13 of the well. The casing carries a suitable head, generally indicated at 14, through which the flow tubing 15 extends downwardly within the liner 12 to a location in more or less close proximity to the bottom of the well.

The small diameter air conduit 16 may be run down into the well within the casing and liner in any suitable manner, as through the casing head 14, in which event a packing gland 17 may be used to prevent gas leakage around the conduit. The conduit carries at suitable intervals a series of valves 18 which usually will be positioned inside the liner 12 within the production zone 13 of the well, with a valve 18a at or above the liquid level and a lowermost valve 18b at or near the lower end of the tubing, or the bottom of the well. If desired, other valves 18c may be positioned at higher locations, and perhaps at higher intervals, within the upper extent of the well. In this manner locations are established for pressure determinations throughout and above the extent of the liquid column standing in the well outside the tubing.

It is to be understood that the valves 18 may be of any suitable type and construction controllable in a manner permitting their selective opening and closing. Accordingly, the specific form of valve shown in Figs. 2 to 4 is to be regarded merely as illustrative. The valve assembly 18 comprises a body 19, having sections 19a and 19b, containing a straight bore 20 into the ends of which the conduit sections are threaded at 21. The body 19 contains a smaller size offset bore 22 communicable with bore 20 through port 23, and with the well through an alined bore 24. Bore 22 contains a vertically reciprocable valve 25 normally maintained in its raised position of engagement with the upper end 20l of the bore (see Fig. 2) by a spring 26 supported on plug 27 threaded into the lower end of the valve bore. The valve carries an arm 28 pivotally movable about a fixed pin 29 between the position of Fig. 3 and the dotted line position appearing in Fig. 2.

Arm 28 projects from the valve through a vertical slot 30 into bore 20 so as to be engageable by the later described operating element as it moves up or down through the bore 20. Movement of the arm 28 from the position of Fig. 2, either to the downwardly swung position of Fig. 3 or the upwardly swung dotted line position of Fig. 2, is resisted by a spring 31 applied to the pin 29 and to the arm, as illustrated.

The valve is operated by a control element which may take the simple form of a heavy metal rod 32 carried on the end of a cable or other flexible line 33 and having sufficient weight to depress the valve and arm 28 when lowered into engagement therewith. The rod 32 is lowered into the upper end portion 16a of the conduit above the air supply line 34, and during the making of pressure determinations, leakage of air about the cable 33 is prevented by a packer 35, of which there are many suitable known types. The cable 33 is run from the conventionally illustrated drum 36 over a suitable guide or pulley 37 into the conduit 16. If for any reason desired, a lubricator comprising a tubular section 38 and a packer 39, may be used to permit the valve operating rod 32 to be run into the conduit 16 without opening the conduit to the atmosphere. Air is forced into the conduit through line 34 by pump or compressor 40, and the air pressure in the conduit is indicated by a gage 41, which is to be regarded as illustrative of any suitable instrument for measuring or recording the conduit air pressure.

In considering the operation of the system, assume all the valves 18 to be closed and the valve operating rod 32 to be run into the conduit 16. By lowering the rod 32 into engagement with arm 28 and the top valve assembly 18a, the arm and valve 25 are pressed down against the resistance of spring 26 to bring the valve port 42 into registration with ports 23 and 24, in the open position of Fig. 3. It will be observed in Fig. 2 that the inner end of the arm 28 bears at 43 against the side of the valve bore 22, thereby preventing the arm from swinging downwardly, and consequently causing the arm and valve to move together until the arm is brought opposite the recess 44. Thereupon, the arm is permitted to be swung down by the rod 32 against the resistance of spring 31.

Before or after opening of the valve 25 as described, the packer 35 may be closed about the cable and the pump 40 started in operation to discharge air into the conduit 16. The pressure at which air is discharged through the ports 23, 42, and 24 into the well determines the well pressure at that location, which pressure is indicated by the gage or recorder 41. The rod 32 then may be lowered to open the valve 18 next below, for determination of the pressure at its location. As the rod 32 is lowered from the position of Fig. 3, spring 31 swings the arm 28 to a horizontal position, permitting the valve 25 to return under the influence of spring 26 to the position of Fig. 2. It will be noted, accordingly, that each valve automatically closes before another pressure determination can be made through a successive valve. At this point it may be observed that upward movement of the rod 32 through the valve bodies is permitted by the arm 28 becoming swung back to the dotted line position of Fig. 2, from which it is returned to the solid line position after passage of the rod 32 through the valve body, by the action of spring 31.

From the foregoing it will be understood that pressure determinations may be made at the location of any or all of the valves 18, and that from such determinations, information of various kinds related to the pressures at the points measured, may be obtained. Since the various uses of pressure data, and correlations thereof, are known to those familiar with the art, no further description need be given with respect to the particular techniques of using and interpreting the pressure readings taken.

I claim:

1. Apparatus for determining sub-surface well pressures, comprising a conduit extending from the top of the well downwardly into the well fluid and having a series of vertically spaced gas discharge passages, means for selectively opening and closing said passages, and means for discharging gas at measured pressure through an opened passage to determine the well pressure at the gas discharge location.

2. Apparatus for determining sub-surface well pressures, comprising a conduit extending from the top of the well downwardly into the well fluid and having a series of vertically spaced discharge passages, means normally closing said passages and operable to selectively open said passages, and means for discharging gas at measured pressure through said conduit and an opened passage to determine the well pressure at the gas discharge location.

3. Apparatus for determining sub-surface well pressures, comprising a conduit extending from the top of the well downwardly into the well fluid and having a series of vertically spaced discharge passages, means within the conduit normally closing said passages and controllable from the top of the well for selectively opening said passages and means for discharging gas at measured pressure through said conduit and an opened passage to determine the well pressure at the gas discharge location.

4. Apparatus for determining sub-surface pressures in a well containing a flow tubing, comprising a conduit extending from the top of the well downwardly outside the tubing into the well fluid and having vertically spaced gas discharge passages in a series extending above and below the well liquid level, individually operable closures for said passages, means for supplying gas at measured pressure to said conduit, and means within the conduit and controlled from the top of the well for selectively opening said closures to discharge gas from the conduit through one of said passages to determine the well pressure at the location of gas discharge.

5. Apparatus for determining sub-surface pressures in a well containing a flow tubing, comprising a conduit extending from the top of the well into the well fluid and containing near its lower end a vertical series of ports, valves individually controlling fluid flow through said ports, means for supplying gas to said conduit at measured pressure, and means for operating said valves selectively to discharge gas from the conduit through a port controlled by one of the valves to determine the well pressure at the location of gas discharge.

6. Apparatus for determining sub-surface pressures in a well containing a flow tubing, comprising a conduit extending from the top of the well into the well fluid and containing near its lower end a vertical series of ports, normally closed valves individually controlling fluid flow through said ports, means for supplying gas to said conduit at measured pressure, and means run down within the conduit for selectively opening said valves to discharge gas from the conduit through a port uncovered by an opened valve and thereby determine the well pressure at the location of gas discharge.

7. Apparatus for determining sub-surface pressures in a well containing a flow tubing, comprising a conduit extending from the top of the well into the well fluid and containing near its lower end a vertical series of ports, normally closed valves individually controlling fluid flow through said ports, means for supplying gas to said conduit at measured pressure, a valve control member run down in the conduit on a cable and operable to selectively open said valves to discharge gas from the conduit through a port uncovered by an opened valve and thereby determine the well pressure at the location of gas discharge.

8. Apparatus for determining sub-surface pressures in a well containing a flow tubing, comprising a conduit extending from the top of the well into the well fluid and having near its lower end a vertical series of ports, normally closed valves individually controlling fluid flow through said ports, means for supplying gas to said conduit at measured pressure, a valve control member run down in the conduit on a cable and operable to open said valves in downward sequence to discharge gas from the conduit through a port uncovered by an opened valve, and means for closing each valve as it is passed by said member.

9. Apparatus for determining sub-surface pressures in a well containing a flow tubing, comprising a conduit extending from the top of the well into the well fluid and having near its lower end a vertical series of ports, normally closed valves individually controlling fluid flow through said ports, a pump at the ground surface for supplying gas to said conduit, means for measuring the pressure of the gas in the conduit, and means run down within the conduit for selectively opening said valves to discharge gas from the conduit through a port uncovered by an opened valve and thereby determine the well pressure at the location of gas discharge.

10. Apparatus for determining sub-surface pressures in a well containing a flow tubing, comprising a conduit extending from the top of the well into the well fluid and having near its lower end a vertical series of ports, normally closed valves individually controlling fluid flow through said ports, a pump at the ground surface for supplying gas to said conduit, means for measuring the pressure of the gas in the conduit, a valve control member run down in the conduit on a cable and operable to selectively open the valves and thereby cause the discharge of gas from the conduit through a port uncovered by an opened valve, and means sealing against the escape of gas between said cable and conduit at the top of the well.

11. Apparatus for determining sub-surface pressures in a well containing a flow tubing, comprising a conduit extending from the top of the well downwardly outside the tubing into the well fluid and having a series of vertically spaced gas discharge passages including one such passage near the lower end of the tubing, means for selectively opening and closing said passages, and means for discharging gas at measured pressure through an opened passage to determine the well pressure at the gas discharge location.

CLARENCE R. DALE.